United States Patent [19]

Thomson

[11] Patent Number: 4,493,094

[45] Date of Patent: Jan. 8, 1985

[54] CLOCK PHASE CONTROL WITH TIME DISTRIBUTION OF PHASE CORRECTIONS

[75] Inventor: David J. Thomson, New Providence, N.J.

[73] Assignee: AT&T Bell Laboratories, Murray Hill, N.J.

[21] Appl. No.: 411,531

[22] Filed: Aug. 26, 1982

[51] Int. Cl.³ .............................................. H03K 5/135
[52] U.S. Cl. ................................... 375/119; 307/511; 328/74; 328/155
[58] Field of Search .................. 375/118, 119; 371/61; 360/51; 307/262, 511, 516, 527, 528; 328/72, 74, 75, 155

[56] References Cited

U.S. PATENT DOCUMENTS

| | | | |
|---|---|---|---|
| 3,668,315 | 6/1972 | Heitzman . | |
| 3,697,689 | 10/1972 | Gibson . | |
| 3,983,497 | 9/1976 | Hegeler | 307/511 |
| 4,206,414 | 6/1980 | Chapman | 328/155 |
| 4,216,544 | 8/1980 | Boleda et al. | 375/119 |
| 4,302,831 | 11/1981 | Zemanek | 375/118 |
| 4,340,863 | 7/1982 | Scordo | 328/74 |
| 4,415,933 | 11/1983 | Murayama et al. | 375/118 |
| 4,423,520 | 12/1983 | Murayama et al. | 328/155 |

*Primary Examiner*—Benedict V. Safourek
*Attorney, Agent, or Firm*—C. S. Phelan

[57] ABSTRACT

A programmable oscillation counter (10) is initially synchronized by presetting the counter to a predetermined correct phase condition by applying thereto a single digital signal set representing the magnitude of the phase correction to be applied. Subsequent tracking of the correct phase condition is accomplished by utilizing additional two's-complement digital signal sets from time to time to preset an incremental counter (11) to a level which indicates the extent of phase error. The latter counter is controlled to reduce the error by altering the phase of the oscillation counter operation by one step at a time each time the oscillation counter cycles through a predetermined phase of its operation and until the incremental counter has counted down its preset phase error magnitude to zero.

4 Claims, 1 Drawing Figure

4,493,094

CLOCK PHASE CONTROL WITH TIME DISTRIBUTION OF PHASE CORRECTIONS

BACKGROUND OF THE INVENTION

This invention relates to a clock phase control system; and it relates, more particularly, to such a system in which a correction for a phase error specified by a set of digital signals is implemented in steps over a period of time.

In clock phase control systems, the output of a high-frequency oscillator is often counted down by a presettable, i.e., programmable, binary counter to obtain a variety of clock signals of different frequencies and phases. The phase adjustment is typically effected by either an add/delete technique or a technique in which the desired phase of operation of a clock system is first determined by separate logic; and then, the clock countdown circuit is reset, or preset, to some fixed predetermined value, which it is desired to maintain at the correct clock phase time, e.g., a binary signal information transition time. Examples of clock phase control systems of this type are represented by the U.S. Pat. No. 3,668,315 issued to J. O. Heitzman, U.S. Pat. No. 4,216,544 issued to A. Boleda et al., and U.S. Pat. No. 3,697,689 issued to E. D. Gibson.

In the present state of the art, electronic systems are often controlled by microprocessors which perform data processing functions, including arithmetic functions, using the so-called two's-complement arithmetic. Clock systems heretofore available usually operate on a one's-complement basis using both positive and negative zero, and are not directly responsive to two's-complement information values so are not directly usable with microprocessor control.

Oftentimes, an electronic system which is synchronized by a clock operates at a much higher frequency than does a microprocessor which controls that system. Accordingly, a phase error signal provided to the clock by such a microprocessor could well, if it were implemented in a single presetting step (wherein one cycle of the microprocessor could encompass many periods of the controlled clock), have a significant adverse impact on the operation of the controlled electronic system circuits.

SUMMARY OF THE INVENTION

The foregoing difficulties in clock phase control systems are substantially alleviated in accordance with the present invention by accomplishing a fine phase control in response to a set of phase error digital signals by utilizing those signals to adjust the counter phase in a succession of small steps until a total adjustment in response to a given set of phase error digital signals is equal to the error magnitude represented by those phase error digital signals.

BRIEF DESCRIPTION OF THE DRAWING

A more complete understanding of the invention and the various features, objects, and advantages thereof may be obtained from a consideration of the following Detailed Description in conjunction with the appended claims and the attached single FIGURE of the drawing representing a schematic block-and-line diagram of an illustrative clock phase control system incorporating the invention.

DETAILED DESCRIPTION

Figure 1:
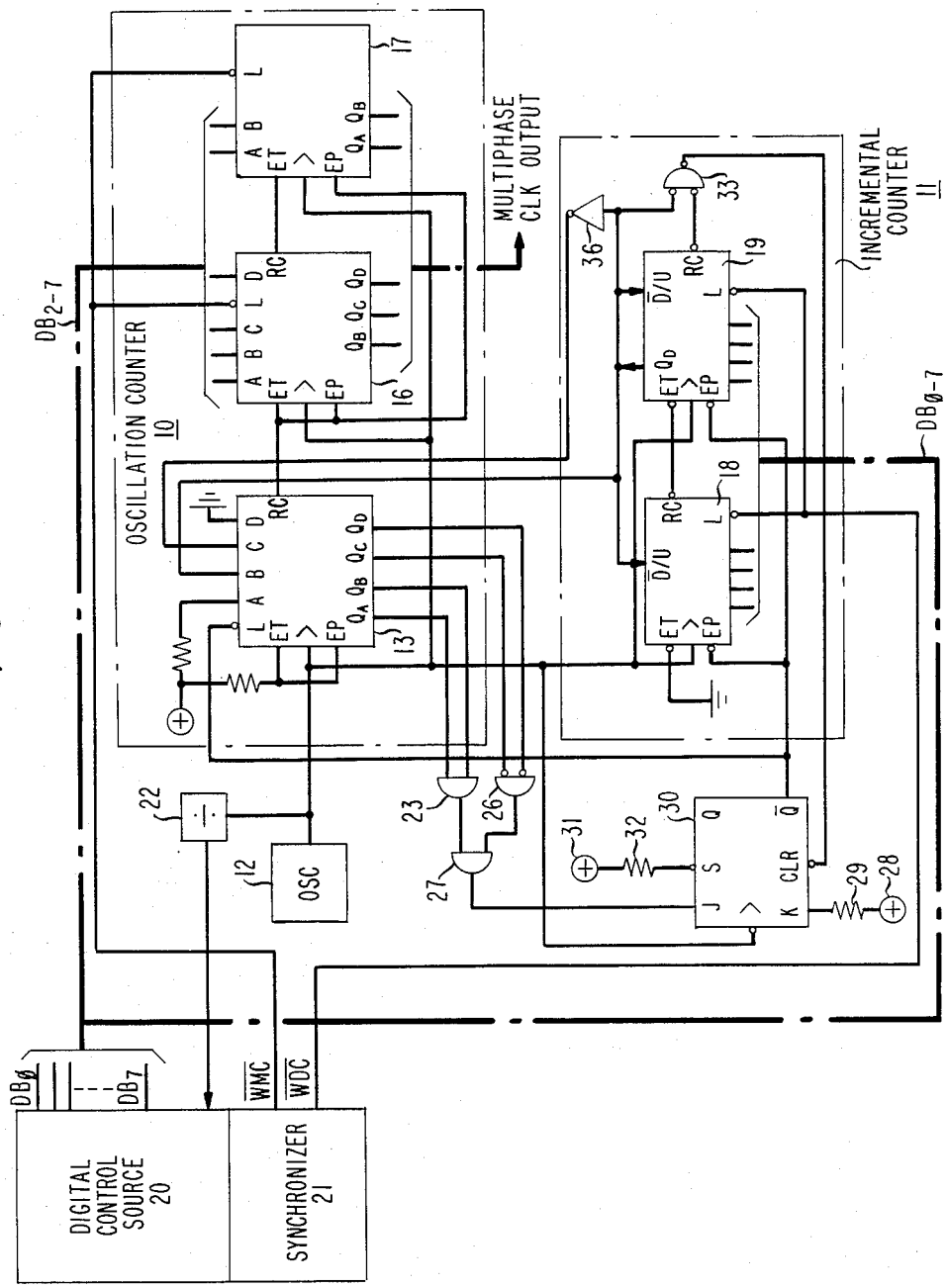

The clock phase control system shown in the drawing includes two count-down chains, a main oscillation counter 10 and an incremental, or delta, counter 11. Both of the counters 10 and 11 are driven from a common oscillation source such as an oscillator 12. That oscillator illustratively operates at an output frequency of 10.24 mHz. The oscillation counter 10 is advantageously a 12-bit ($\emptyset$-11) counter, including three 4-stage counter sections 13, 16, and 17, connected in cascade, for dividing down the output of oscillator 12 by 4096. However, certain of the more significant order bits, such as the bits 6-10, are the only ones illustratively made available for utilization of the clock output signals appearing at their respective stage outputs. Less significant order bits are reserved for, e.g., a control function, to be described. The incremental counter 11 is advantageously an 8-bit ($\emptyset$-7) counting chain, including two 4-stage, reversible counter sections 18 and 19 connected in cascade.

All of the counter sections are of types having two control inputs ET and EP, which must both have enabling signals present in order that the section may count. They also have a load input L that must have an enabling signal present to allow bit-parallel programming, or preset, input signals to be loaded overwriting any prior content of the stages loaded. The bit-parallel loading function is independent of the counting control input signal states. Look-ahead ripple carry output (RC) is also provided for these counter sections. In counter 10, RC goes high when the counter section operation is passing into, and while it is in, the all-ONE's state. In counter 11, RC goes high when either the section is in the all-ONE's state and counting up, or the section is in the all-ZERO state and counting down.

Both of the counters 10 and 11 are presettable by different sets of digital binary-coded signals from a data bus extending from any convenient digital control source 20 of digital control signals. The data bus includes, at the output of source 20, a plurality of individual bit circuits DB$\emptyset$-7, all of which are employed for presetting incremental counter 11. Only the six most significant bits DB2-7 of the data bus are employed for presetting bit stages 4-9 of oscillation counter 10.

A synchronizer 21 is associated with the source 20 and controlled thereby to produce enabling signals for parts of the clock phase control system at times determined by operation of source 20. A frequency divider 22 couples the output of oscillator 12 to source 20 and schematically represents a synchronous operating relationship therebetween. In the example, divider 22 advantageously divides by 4 and schematically represents a typical situation in which such a source is clocked at a lower rate (herein 2.56 mHz) than the highest available rate in the output of oscillator 12.

Source 20 is any convenient source, e.g., a microprocessor or other data processing unit, of digital binary-coded signals defining in two's-complement form, the sign and magnitude of an electrical phase angle through which operation of counter 10 is to be altered. For example, the phase angle is advantageously a phase error between operation of counter 10 and a predetermined reference phase. Those signals are provided in association with control signals from synchronizer 21 designating when the altering operation should begin. The manner in which that phase angle and beginning time information is obtained depends upon the nature of the system using the output signals of counter 10 and comprises no part of the present invention.

Oscillation counter 10 operates in a routine counting mode until bit-parallel signals on data bus circuits DB2-7 are received at the presetting inputs of counter stages 4-9 at the same time that the counter sections 16 and 17 are enabled for loading information at those same parallel inputs by a $\overline{WMC}$ signal applied through an inverting input connection from synchronizer 21. Thus, the five stages producing the aforementioned 5-bit clock outputs, and the next lower stage in counter section 16 are preset. All six of the preset stages can be used to provide outputs if needed in the system being clocked. The presetting inserts, in the indicated counter stages, a binary-coded value corresponding to the magnitude of a phase error with respect to a predetermined phase reference and assures that counter sections 16 and 17 will, in future counting operation, recycle to the zero-count level at the occurrence time phase of a predetermined reference point in the aforementiond predetermined phase reference.

As oscillation counter 10 operates in the manner just described, its least significant counter section 13 divides down the output of oscillator 12 by sixteen. The four individual stage outputs of counter section 13 comprise binary-coded signals which, together, define time phase subdivisions of each least significant counting interval of counter section 16. The two least significant bit outputs $Q_A$ and $Q_B$ of counter section 13 are applied to inputs of an AND gate 23, and the two most significant bit outputs $Q_C$ and $Q_D$ of the same section are applied to a second AND gate 26 through inverting input connections. Outputs of AND gates 23 and 26 control a further AND gate 27. Consequently, the output of gate 27 is high at each count of the value three in counter section 13.

An output of gate 27 is applied to the J input connection of a JK bistable, or flip-flop, circuit 30 that is clocked on the negative-going edge of each pulse in the output of oscillator 12. The K input of that bistable circuit 30 is permanently biased to the trigger enabling state by connection from a positive potential supply 28 through a current limiting resistor 29. The supply 28, and other similar supplies, indicated in the drawing, are schematically represented by a circled polarity sign indicating a connection to a terminal of the indicated polarity of a source, such as a battery, having its terminal of opposite polarity connected to ground. The synchronous setting input connection of the bistable circuit 30 is permanently disabled by a positive voltage supply 31 connected through a resistor 32 and an inverting input connection.

A clearing input CLR of bistable circuit 30 is coupled through an inverting input connection to receive an output of incremental counter 11, to be described, for holding the bistable circuit in its cleared, or reset, state in response to a predetermined state of counter 11. Absent that holding signal, each 3-count output from counter section 13 in oscillation counter 10 sets the bistable circuit 30 on the next occurring negative edge of the output pulse from oscillator 12; and on the negative edge of the second following oscillator pulse, the K input to bistable circuit 30 will dominate and cause the circuit to be reset. When the holding, or clearing, signal from counter 11 is present at the bistable circuit 30, that circuit is held in the cleared state, regardless of 3-count or other signal variations at the J input of the bistable circuit. In that condition, circuit 30 output disables counter 11 and disables the preset loading of counter section 13.

Incremental counter 11 has its bit-parallel inputs enabled by application of a $\overline{WDC}$ signal through inverting input connections to load enabling inputs L. The $\overline{WDC}$ signal is supplied from synchronizer 21 in coincidence with data bus circuit DB0-7 signals from source 20 and defining the size and direction of a distributed phase adjustment which is to be made.

The ET input of counter section 18 is permanently enabled by the connection of ground thereto through an inverting input connection. That section is further enabled, as is the counter section 19, by application of the $\overline{Q}$ output of bistable circuit 30 to their respective EP enabling input connections through inverting connections when that bistable circuit is in its set state. However, when the bistable circuit is held in the cleared state, as previously described, counter sections 18 and 19 are unable to operate for counting output pulses of oscillator 12. Otherwise, counter sections 18 and 19 are enabled to count in response to the occurrence of each 3-count in counter section 13; and section 18 counts one pulse from oscillator 12 before bistable circuit 30 is again reset. Each time that section 18 passes in its operation from a finite count value to the all-ZERO state, its ripple count output RC is coupled through an inverting output connection on section 18 and an inverting input connection on section 19 for enabling the latter section also to count an output pulse of oscillator 12.

The direction of counting for counter sections 18 and 19 is determined by the most significant bit output $Q_D$ signal state of section 19, and that output is coupled to the direction control input connection $\overline{D}/U$ of each of the sections 18 and 19. Sections 18 and 19 are able to count only one oscillator pulse at a time because that same pulse advances counter section 13 beyond the 3-count level so that the subsequent oscillator output pulse resets bistable circuit 30 for disabling counting operation in sections 18 and 19. That disabled condition persists until counter section 13 of oscillation counter 10 steps through its counting cycle to the 3-count level once more.

When the most significant bit output $Q_D$ of counter section 19 in incremental counter 11 is in the binary ZERO state, the resulting low output indicates a positive binary-coded value in the incremental counter 11; and that value causes the counter sections 18 and 19 to count down toward the all-ZERO state, a step at a time, each time counter section 13 passes through the 3-count level. Similarly, when that most significant bit of section 19 is in the binary ONE state, its resulting high output indicates a negative value in counter 11; and that output causes counter sections 18 and 19 to count up toward the all-ZERO state.

A high ripple count output RC from counter section 19, each time that section counts into the all-ZERO count state, is twice-inverted to provide an enabling input to an AND gate 33. A coincidence with that state of a low $Q_D$ output from section 19 activates gate 33 (indicating that the entire incremental counter 11 is at the all-ZERO state), and the resulting true (active low) output of gate 33 is coupled through the inverting clear input connection to bistable circuit 30 for holding that circuit in its clear condition with the results hereinbefore described. That is, upon the activation of gate 33, bistable circuit 30 is reset; and incremental counter 11 is disabled for further counting until it receives, in coincidence, a new control signal $\overline{WDC}$ and a new set of digital input signals for loading into the counter.

The counter section 19 most significant bit output $Q_D$ is applied to the bit B parallel input of counter section 13 in oscillation counter 10. That same output from section 19 is also coupled through an inverter to the bit C input of section 13. If the section 19 $Q_D$ output is low (indicating a positive phase error), the binary ZERO and ONE states are applied to the section 13 B and C inputs, respectively. Similarly, a high $Q_D$ output (indicating a negative phase error) applies the binary ZERO and ONE states to those B and C inputs, respectively.

Each time that counter section 13 cycles through the 3-count level to set bistable circuit 30, the resulting low $\overline{Q}$ output is converted at section 13 to a high level signal by an inverting input connection to the load enabling input of counter section 13. That high signal forces the bit stages B and C of oscillation counter 10 to conform to the one of the aforementioned bit combinations determined by the binary signal state of the $Q_D$ output of counter section 19. If the $Q_D$ output is high, indicating a negative phase error, the bit stages B and C of counter 10 are loaded with the value ONE, ZERO. That is, they are held in the states which, together with the stage A state of ONE, comprise the 3-count for retarding the clock counter phase for the duration of one oscillator 12 output pulse to reduce the phase error. However, if the $Q_D$ output of section 19 is low, indicating a positive phase error, a ZERO, ONE value is set into the stages B and C of counter section 13 to cause them, with the stage A state of ONE, to represent the count level of 5 for advancing the phase of oscillation counter 10 and, thereby, reduce the phase error.

Thus, once a set of digital signals representing a phase error with respect to a predetermined phase reference is loaded into incremental counter 11, that counter then operates from that value toward the all-ZERO counter condition, a step at a time, on each occurrence of a 3-count in counter section 13. This reduces the magnitude of the error value in incremental counter 11; and the coupling from counter 11 to counter section 13 correspondingly reduces the phase error, with respect to the phase reference, in the operation of oscillation counter 10. This phase error adjustment process continues in steps, each comprising a fraction of a least significant bit interval in the operation of counter section 16, until the phase error value in counter 11 has been zeroed. At that time, bistable circuit 30 is held cleared; and counter 11 ceases operation until it is provided with a new phase error value.

Although the present invention has been described in connection with a particular embodiment thereof, it is to be understood that additional embodiments, applications, and modifications thereof, which will be apparent to those skilled in the art, are included within the spirit and scope of the invention.

What is claimed is:

1. A clock phase control system comprising
a programmable clock oscillation counter, and
means, responsive to a single set of digital signals representing a phase error magnitude, for adjusting the phase of said oscillation counter in multiple periodic steps until a total adjustment equal to said magnitude has been achieved.

2. The clock phase control system in accordance with claim 1 in which
said oscillation counter includes a plurality of stages connected for operation in cascade in a cyclic counting operation,
means are provided for limiting the occurrence time of each of said phase adjusting steps to different recurrences of a predetermined time phase of operation of said oscillation counter,
said plurality of stages comprises a group of low order stages connected both to receive oscillation counter phase adjustments from said phase adjusting means and to indicate said predetermined time phase, and
said plurality of stages comprises a group of high order stages connected to provide clock output signals.

3. The clock phase control system in accordance with claim 1 in which said adjusting means comprises
a programmable, incremental counter connected to be preset by said phase error indicating digital signals, said signals including both magnitude and direction information regarding said error,
means for applying to each of said oscillation and incremental counters drive signals of the same phase and frequency,
means, responsive to a most significant bit of said phase error indicating digital signal, for controlling the direction of operation of said incremental counter to count toward zero magnitude from a preset count value equal to said phase error indicating digital signals,
means for inhibiting operation of said incremental counter in response to said drive signals except at a predetermined time phase of operation of said oscillation counter,
means, responsive to said predetermined time phase, for adjusting the phase of said oscillation counter in a direction determined by the binary signal state of the most significant bit of said incremental counter, and
means, responsive to attainment of a zero count level in said incremental counter, for inhibiting phase adjustment of said oscillation counter and operation of said incremental counter.

4. The clock phase control system in accordance with claim 3 in which there are provided
a bistable circuit,
means for setting said bistable circuit to a first binary signal state only during each occurrence of said predetermined time phase,
means, responsive to said first binary signal state of said bistable circuit, for actuating said phase adjusting means of said oscillation counter,
means, responsive to said first binary signal state of said bistable circuit, for enabling operation of said incremental counter, and
means, including said incremental counter operation inhibiting means and responsive to a second binary signal state of said bistable circuit, for actuating said incremental counter operation inhibiting means.

* * * * *